United States Patent
Saito (10) Patent No.: US 11,568,270 B2
(45) Date of Patent: Jan. 31, 2023

(54) NON-TRANSITORY COMPUTER-READABLE STORAGE MEDIUM STORING IMPROVED GENERATIVE ADVERSARIAL NETWORK IMPLEMENTATION PROGRAM, IMPROVED GENERATIVE ADVERSARIAL NETWORK IMPLEMENTATION APPARATUS, AND LEARNED MODEL GENERATION METHOD

(71) Applicant: Preferred Networks, Inc., Tokyo (JP)

(72) Inventor: Masaki Saito, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 827 days.

(21) Appl. No.: 16/133,565

(22) Filed: Sep. 17, 2018

(65) Prior Publication Data

US 2019/0087730 A1 Mar. 21, 2019

(30) Foreign Application Priority Data

Sep. 19, 2017 (JP) .............................. JP2017-179570

(51) Int. Cl.
G06N 3/10 (2006.01)
G06N 3/04 (2006.01)
G06N 3/08 (2006.01)

(52) U.S. Cl.
CPC ........... G06N 3/105 (2013.01); G06N 3/0472 (2013.01); G06N 3/088 (2013.01)

(58) Field of Classification Search
CPC ............................... G06N 3/105; G06N 3/088
See application file for complete search history.

(56) References Cited

U.S. PATENT DOCUMENTS

2017/0140524 A1* 5/2017 Karsenti .............. G06K 9/6269
2018/0144243 A1* 5/2018 Hsieh ...................... G06F 11/30
2018/0336439 A1* 11/2018 Kliger ................. G06N 3/0472

OTHER PUBLICATIONS

Neyshabur et al. (Stabilizing GAN Training with Multiple Random Projections, May 2017, pp. 1-17) (Year: 2017).*
Liu et al. (Coupled Generative Adversarial Networks, Dec. 2016, pp. 1-9) (Year: 2016).*
Lorenzo-Trueba et al. (Misperceptions of the emotional content of natural and vocoded speech in a car, Aug. 2017, pp. 606-610) (Year: 2017).*
Nguyen et al. (Dual Discriminator Generative Adversarial Nets, Dec. 2017, pp. 1-11) (Year: 2017).*

(Continued)

Primary Examiner — George Giroux
(74) Attorney, Agent, or Firm — Foley & Lardner LLP (57) ABSTRACT

A generation function to generate and output generated data from an input, a discrimination function to cause each discriminator to discriminate whether the data to be discriminated is based on the training data or the generated data and to output a discrimination result. Also an update function to update the discriminator that has output the discrimination result such that the data to be discriminated is discriminated with higher accuracy, and to further update the generator to increase a probability of discriminating that the generated data-based data to be discriminated is the training data-based data, and a whole update function to cause the updates to be executed for the generator and all the discriminators.

24 Claims, 4 Drawing Sheets

(56) References Cited

OTHER PUBLICATIONS

"Generative Adversarial Nets", Ian J. Goodfellow et al., Jun. 10, 2014, arXiv, https://arxiv.org/abs/1406.2661, 9 pages.
H. Zhang, et al., "StackGAN: Text to Photo-realistic Image Synthesis with Stacked Generative Adversarial Networks," Aug. 5, 2017, arXiv, https://arxiv.org/abs/1612.03242v2.
I. Durugkar, et al., "Generative Multi-Adversarial Networks," Mar. 2, 2017, arXiv, https://arxiv.org/abs/1611.01673v3.

* cited by examiner

NON-TRANSITORY COMPUTER-READABLE STORAGE MEDIUM STORING IMPROVED GENERATIVE ADVERSARIAL NETWORK IMPLEMENTATION PROGRAM, IMPROVED GENERATIVE ADVERSARIAL NETWORK IMPLEMENTATION APPARATUS, AND LEARNED MODEL GENERATION METHOD

CROSS REFERENCE TO RELATED APPLICATIONS

The present application claims priority under the Paris Convention to Japanese Patent Application No.2017-179570, filed on Sep. 19, 2018.

BACKGROUND

Technical Field

The present invention relates to an improved generative adversarial network (GAN) improved from a GAN.

Related Art

Studies on generative models that automatically learn the features of observation data from the observation data are important in many fields including computer vision, natural language processing, and speech processing. Use of these learned features makes it possible to efficiently solve many problems of machine learning such as image generation, super-resolution, frame interpolation, data expansion, and abnormality detection.

As generative models, many models exemplified by Deep Boltzmann Machine and Pixel Networks have already been proposed. As one of the generative models, there is a generative adversarial network (hereinafter referred to as GAN). A feature of the GAN is that the GAN uses two networks called a generator and a discriminator and causes these networks to compete with each other, whereby the GAN learns a highly accurate generative model.

Specifically, the generator generates a learning sample that looks real and fools the discriminator as much as possible from an appropriate random number. Meanwhile, the discriminator discriminates whether the given sample is a sample generated by the generator or a learning sample itself. Causing these two models to learn enables the generator to ultimately generate a sample that is as close as possible to a real one only from a random number.

"Generative Adversarial Networks" Ian J. Goodfellow et al. (2014) proposes a GAN as one method of generative models.

SUMMARY

The GAN has superiority over other generative models in that the GAN can generate high quality samples, but the GAN has problems that roughly fall into the following two types.

The first problem is the instability of learning. Unlike learning of a conventional discriminative model, learning of the GAN is known to be very unstable, and it is necessary to carefully design both a generator and a discriminator in order to cause a good quality generator to learn. To deal with this problem, Improved GAN, Denoising GAN, and the like are proposed as representative models, but it is still hard to say that the problem is completely solved.

The second problem is the deterioration of quality under higher dimensions. Let us consider a case where the number of dimensions of a learning sample (training data) is very high. Examples of the learning sample having such a property include speech (on the order of tens of thousands of dimensions) and images (on the order of hundreds of thousands of dimensions). It is known that it is difficult to learn such an ultra-high dimensional generative model. For example, it can be said that in a case where an image whose resolution is doubled is used as a learning sample, the quality of a generated image generally deteriorates.

The present invention has been made in view of the above problems. It is an object of the present invention to provide a non-transitory computer-readable storage medium storing an improved generative adversarial network implementation program, an improved generative adversarial network implementation apparatus, and a learned model generation method for providing a generative model capable of improving the stability of learning and increasing the quality of generated data.

A non-transitory computer-readable storage medium storing an improved generative adversarial network implementation program according to an embodiment of the present invention causes a computer to implement a generation function configured to cause a generator to generate and output generated data, the generator generating and outputting the generated data from a predetermined input on the basis of on a function expressed by a configuration of a multilayer perceptron, a discrimination function configured to cause each of a plurality of discriminators to execute discrimination processing to output a discrimination result, each of the plurality of discriminators configured to receive an input of data to be discriminated that is based on training data and/or the generated data output by the generator, each of the plurality of discriminators performing the discrimination processing that discriminates whether the data to be discriminated is based on the training data or based on the generated data, on the basis of a function expressed by a configuration of a multilayer perceptron, each of the plurality of discriminators outputting a discrimination result, an update function configured to update the discriminator that has output the discrimination result, on the basis of the discrimination result such that the data to be discriminated can be discriminated with higher accuracy, the update function configured to further update the generator such that a probability that the discriminator discriminates that the data to be discriminated that is based on the generated data is the data to be discriminated that is based the training data increases, and a whole update function configured to cause the updates by the update function to be executed for the generator and all the discriminators.

Furthermore, in the non-transitory computer-readable storage medium storing an improved generative adversarial network implementation program according to the embodiment of the present invention, the data to be discriminated is the training data itself and/or the generated data itself.

Furthermore, the non-transitory computer-readable storage medium storing an improved generative adversarial network implementation program according to the embodiment of the present invention causes the computer to implement a deformation processing function and then implement the discrimination processing function. The deformation processing function is configured to cause each of the plurality of deformation operators to execute deformation processing, each of the plurality of deformation operators performing the deformation processing on the training data and/or the generated data in the preceding stage of each of the plurality of discriminators. The deformation processing function is configured to then cause each deformation operator to output training data subjected to the deformation processing and/or generated data subjected to the deformation processing obtained by the deformation processing, as the data to be discriminated, to the discriminator corresponding to each deformation operator.

Furthermore, the non-transitory computer-readable storage medium storing an improved generative adversarial network implementation program according to the embodiment of the present invention, contents of the deformation processing executed by the plurality of deformation operators are different from each other.

Furthermore, the non-transitory computer-readable storage medium storing an improved generative adversarial network implementation program according to the embodiment of the present invention causes the computer to implement the deformation processing function and the discriminated function in a state in which the plurality of deformation operators whose number is the same as the number of the plurality of discriminators is provided, and the deformation operators and the discriminators are paired in a one-to-one correspondence.

An improved generative adversarial network implementation apparatus according to an embodiment of the present invention includes a generation unit, a discrimination unit, an update unit, and a whole update unit. The generation unit is configured to cause a generator to generate and output generated data, the generator generating and outputting the generated data from a predetermined input on the basis of a function expressed by a configuration of a multi layer perceptron. The discrimination unit is configured to cause each of a plurality of discriminators to execute discrimination processing to output a discrimination result, each of the plurality of discriminators configured to receive an input of data to be discriminated that is based on training data and/or the generated data output by the generator, each of the plurality of discriminators performing the discrimination processing that discriminates whether the data to be discriminated is based on the training data or based on the generated data, based on a function expressed by a configuration of a multilayer perceptron, each of the plurality of discriminators outputting a discrimination result. The update unit is configured to update the discriminator that has output the discrimination result, on the basis of the discrimination result such that the data to be discriminated can be discriminated with higher accuracy. The update unit is configured to further update the generator so that a probability that the discriminator discriminates that the data to be discriminated that is based on the generated data is data to be discriminated that is based the training data increases. The whole update unit is configured to cause the updates by the update unit to be executed for the generator and all the discriminators.

Furthermore, the improved generative adversarial network implementation apparatus according to the embodiment of the present invention further includes a deformation processing unit. The deformation processing unit is configured to cause each of a plurality of deformation operators to execute deforming processing, each of the plurality of deformation operators performing the deformation processing on the training data and/or the generated data in the preceding stage of each of the plurality of discriminators. The deformation processing unit is configured to then cause each deformation operator to output training data subjected to the deformation processing and/or generated data subjected to the deformation processing obtained by the deformation processing, as the data to be discriminated, to the discriminator corresponding to each deformation operator.

A learned model generation method according to an embodiment of the present invention includes a generation step, a discrimination step, an update step, and a whole update step. The generation step is a step of causing a generator to generate and output generated data, the generator generating and outputting the generated data from a predetermined input on the basis of a function expressed by a configuration of a multilayer perceptron. The discrimination step is a step of causing each of a plurality of discriminators to execute discrimination processing to output a discrimination result, each of the plurality of discriminators configured to receive an input of data to be discriminated that is based on training data and/or the generated data output by the generator, each of the plurality of discriminators performing the discrimination processing that discriminates whether the data to be discriminated is based on the training data or based on the generated data, based on a function expressed by a configuration of a multilayer perceptron, each of the plurality of discriminators outputting a discrimination result. The update step is a step of updating the discriminator that has output the discrimination result on the basis of the discrimination result such that the data to be discriminated can be discriminated with higher accuracy and furthermore, of updating the generator such that a probability that the discriminator discriminates that the data to be discriminated that is based on the generated data is the data to be discriminated that is based on the training data increases. The whole update step is a step of causing the updates by the update step to be executed for the generator and all the discriminators.

Furthermore, in the learned model generation method according to the embodiment of the present invention, a deformation processing step is executed and then the discrimination step is executed. The deformation processing step is a step of causing each of a plurality of deformation operators to execute deformation processing, each of the plurality of deformation operators performing the deformation processing on the training data and/or the generated data in the preceding stage of each of the plurality of discriminators. The deformation processing step is the step of then causing each deformation operator to output training data subjected to the deformation processing and/or generated data subjected to the deformation processing obtained by the deformation processing, as the data to be discriminated, to the discriminator corresponding to each deformation operator.

According to the embodiments of the present invention, a plurality of discriminators is provided for one generator, and a plurality of deformation operators is provided in order that data obtained by performing the deformation processing on the generated data and the training data, which is to be discriminated by the plurality of discriminators, is set as the data to be discriminated. After the plurality of deformation operators deforms original data by various deformation processing, data subjected to the deformation processing is input in each of the plurality of discriminators and updates are performed for the generator and each of the plurality of discriminators. Therefore, as compared with a case where a conventional generator and a conventional discriminator correspond to each other in a one-to-one correspondence, it is possible to improve the stability of learning and it is also possible to generate high quality generated data even if an ultra-high dimensional generative model is caused to learn. Furthermore, by variously differentiating the contents of the deformation processing in the plurality of deformation operators, the learning progresses such that the generator generates generated data corresponding to various deformation processing. Therefore, the embodiments of the present invention is effective in improving the stability of the learning and increasing the quality of the generated data.

BRIEF DESCRIPTION OF DRAWINGS

FIG. 3 is a flowchart showing a flow of processing in the improved generative adversarial network implementation apparatus.

DETAILED DESCRIPTION

First Embodiment

Figure 1:
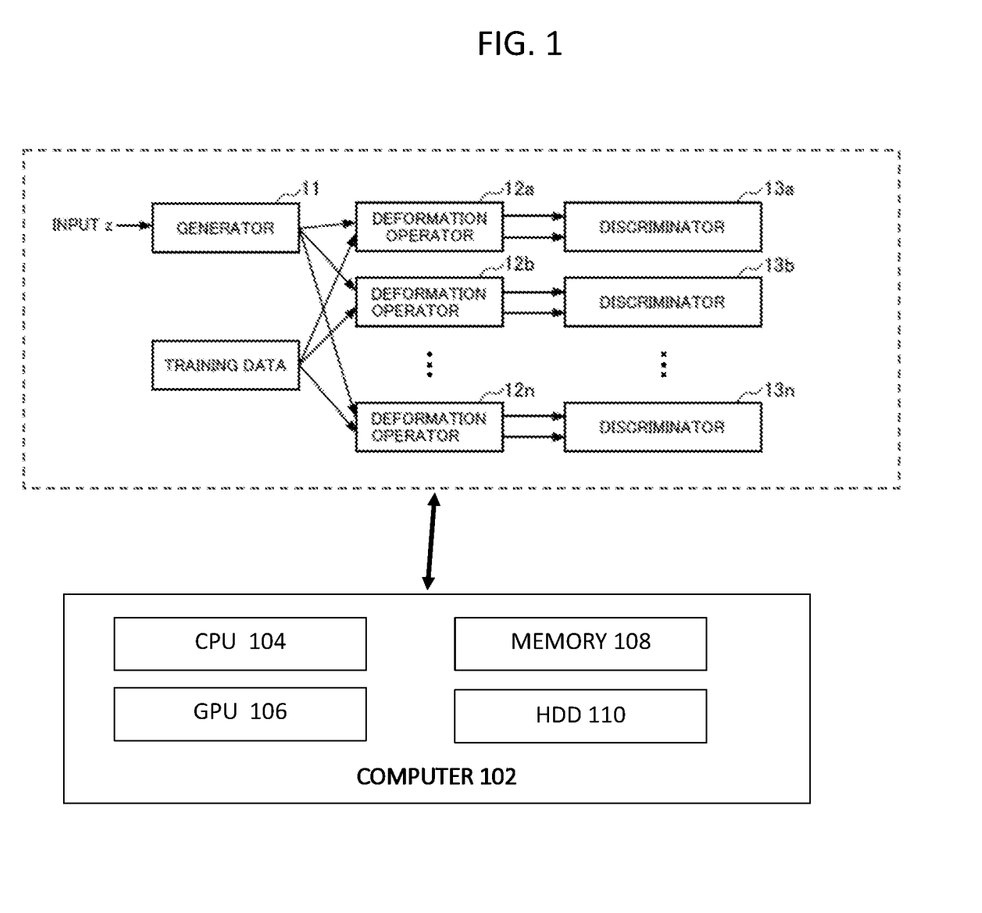
FIG. 1 is a conceptual diagram showing a configuration of an improved generative adversarial network according to an embodiment of the present invention.

Hereinafter, an exemplary improved generative adversarial network implementation apparatus according to a first embodiment will be described with reference to the drawings. FIG. 1 is a conceptual diagram showing a configuration of the improved generative adversarial network according to the embodiment of the present invention. Note that the configuration for implementing the generative adversarial network may be an improved generative adversarial network implementation apparatus designed as a dedicated machine, but the configuration can be implemented by a general computer 102. The computer used in this case is equipped with a central processing unit (CPU) 104, a graphics processing unit (GPU) 106, a memory 108, and a storage device 110 such as a hard disk drive that a general computer would include. Furthermore, the various processing is executed by programs in order to cause the improved generative adversarial network to function in these general computers. As shown in FIG. 1, an improved generative adversarial network 10 in the present embodiment includes a generator 11, a plurality of deformation operators 12a to 12n, and a plurality of discriminators 13a to 13n. While a conventional GAN proposed in "Generative Adversarial Networks" Ian J. Goodfellow et al. (2014) includes one generator and one discriminator, the present embodiment uses the plurality of discriminators for one generator.

$$\min_G \max_D V(D, G) = \qquad \text{[Equation 1]}$$

$$\mathbb{E}_{x \sim p_{data}(x)}[\log D(x)] + \mathbb{E}_{z \sim p_z(z)}[\log(1 - D(G(z)))].$$

In Equation 1 above, an input noise variable $p_z(z)$ is predefined in order to know a distribution $p_g$ of the generator for data x, and mapping to a data space is denoted as $G(z; \theta_g)$. Herein, G is a function with respect to a differentiable generator represented by a multilayer perceptron having a parameter $\theta_g$. Furthermore, a second multilayer perceptron $D(x; \theta_d)$ that outputs a single scalar will be defined. $D(x)$ is a function regarding a differentiable discriminator represented by a multilayer perceptron having a parameter $\theta_d$ and a scalar value to be output represents a probability that x comes from training data rather than $p_g$.

In the process of learning, the function D of the discriminator is updated to maximize a probability of accurately discriminating the training data and the generated data generated by the function G. The function D is updated by updating the parameter $\theta_d$. At the same time, the function G of the generator is updated to minimize log (1-D(G(z))). The function G is updated by updating the parameter $\theta_g$. By alternately performing the update of the function D and the update of the function G in this manner, it is possible to obtain a generator capable of generating generated data approximate to the training data to the extent that the discriminator incorrectly discriminates that the generated data is the training data.

In the improved generative adversarial network 10 of the present embodiment shown in FIG. 1, in a case where the generator 11 is updated or in a case where the discriminators 13a to 13n are updated, processing similar to the update processing based on Equation 1 described above is executed on the basis of a theory disclosed in "Generative Adversarial Networks" Ian J. Goodfellow et al. (2014). In the present embodiment, the update processing of alternately performing the updates on the basis of the objective function shown in the above Equation 1 is performed for one generator 11 and each of the plurality of discriminators 13a to 13n. Furthermore, the plurality of deformation operators 12a to 12n is provided. The plurality of deformation operators 12a to 12n is configured to perform deformation processing on the training data and/or the generated data in the preceding stage of each of the plurality of discriminators 13a to 13n and outputs data to be discriminated. Details will be described below.

Figure 2:
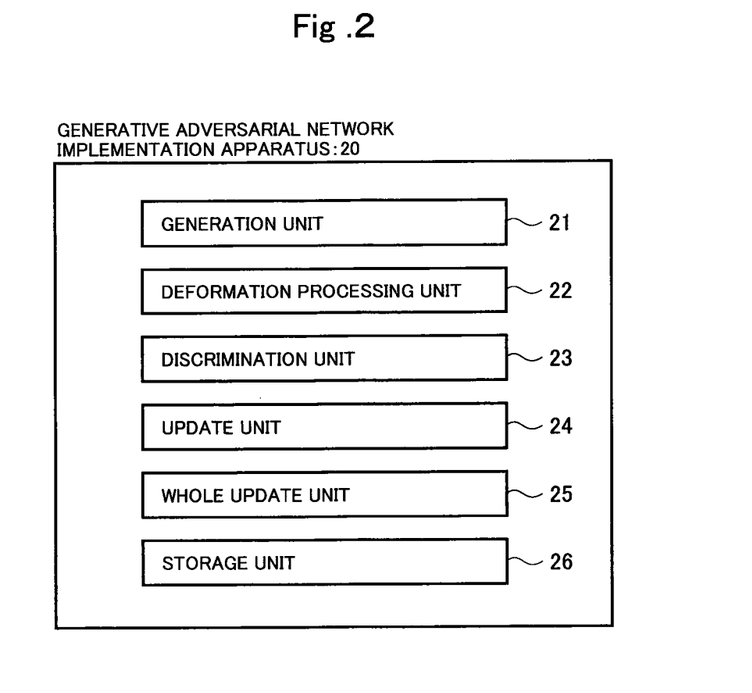
FIG. 2 is a block diagram showing a configuration of an improved generative adversarial network implementation apparatus.

FIG. 2 is a block diagram showing a configuration of the improved generative adversarial network implementation apparatus 20 according to the present embodiment. As shown in FIG. 2, the improved generative adversarial network implementation apparatus 20 includes a generation unit 21, a deformation processing unit 22, a discrimination unit 23, an update unit 24, a whole update unit 25, and a storage unit 26.

The generation unit 21 has a function configured to cause the generator 11 to generate and output generated data, the generator 11 generating and outputting the generated data from a predetermined input on the basis of a function expressed by a configuration of a multilayer perceptron. The predetermined input to the generator 11 may be, for example, noise generated by a noise generator.

The deformation processing unit 22 has a function configured to cause each of the plurality of deformation operators 12a to 12n to execute the deformation processing, each of the plurality of deformation operators 12a to 12n the performing deformation processing on the training data and/or the generated data in the preceding stage of each of the plurality of discriminators 13a to 13n. The function is configured to then cause each of the plurality of deformation operators 12a to 12n to output training data subjected to the deformation processing and/or generated data subjected to the deformation processing obtained by the deformation processing, as the data to be discriminated, to discriminators 13a to 13n respectively corresponding to the deformation operators 12a to 12n. The contents of the deformation processing are preferably set such that each of the deformation operators 12a to 12n performs different processing. The deformation processing in the deformation operators 12a to 12n may be anything. In the case of image generation, examples of the deformation processing include reduction processing, blurring processing, and a contrast change. In the case of sound generation, examples of the deformation processing include a sampling rate change and reverberation processing. Furthermore, although the contents of the deformation processing may be anything, the content of the deformation processing preferably includes processing of reducing the information amount of original data such as reduction processing in order to appropriately implement the learning of an ultra-high dimensional generative model. Note that it is not always necessary to differentiate all the contents of the deformation processing, and two or more deformation operators may be assigned to perform the deformation processing whose contents are the same as each other.

The discrimination unit 23 has a function configured to cause each of the plurality of discriminators 13a to 13n to execute the discrimination processing to output a discrimination result. Each of the plurality of discriminators 13a to 13n is configured to receive an input of the data to be discriminated that is based on the training data or the generated data. Each of the plurality of the discriminators 13a to 13n is for performing the discrimination processing that discriminates whether the data to be discriminated is based on the training data or based on the generated data, on the basis of on a function expressed by a configuration of a multilayer perceptron. Each of the plurality of discriminators is for outputting a discrimination result. In the present embodiment, the data to be discriminated that is based on the training data or the generated data is training data subjected to the deformation processing or generated data subjected to the deformation processing after the deformation processing is performed in the deformation processing unit 22. It is thought that the discrimination result output from each of the discriminators 13a to 13n takes, for example, a value between 0 and 1, and as the value becomes closer to 1, the value indicates a higher probability that the data to be discriminated is based on the training data.

The update unit 24 has a function configured to update the discriminator that has output the discrimination result on the basis of the discrimination result such that the data to be discriminated can be discriminated with higher accuracy, the function being configured to further update the generator 11 such that the probability that the discriminator discriminates that the data to be discriminated is based on the generated data is data to be discriminated that is based on the training data increases. The update processing for the discriminator and the update processing for the generator in this update unit 24 are performed in a manner similar to that in "Generative Adversarial Networks" Ian J. Goodfellow et al. (2014). More specifically, the update processing for the discriminator is processing of updating the parameter θd regarding the function D represented by the discriminator, and the update processing for the generator is processing of updating the parameter θg regarding the function G represented by the generator. The updates of these parameters are performed, for example, by a stochastic gradient descent method, and the gradient of the function is updated so as to approach the object of minimization or maximization.

The whole update unit 25 has a function configured to cause the update processing by the update unit 24 to be executed for the generator 11 and all the discriminators 13a to 13n.

The storage unit 26 has a function configured to store the configuration of the improved generative adversarial network 10 and storing necessary information in various processing of the improved generative adversarial network implementation apparatus 20. Examples of the information to be stored include training data provided in advance for training on the contents to be generated by the generator 11, the configuration of the multilayer perceptron of the generator 11, the generated data generated by the generator 11, the configuration of the multilayer perceptron of each of the discriminators 13a to 13n, the discrimination result output by the discriminators 13a to 13n, information on the contents of the deformation processing in the deformation operators 12a to 12n, the generated data subjected to the deformation processing and the training data subjected to the deformation processing after the deformation processing by the deformation operators 12a to 12n, and information on various parameters at the time of the update processing.

Next, a flow of processing in the improved generative adversarial network implementation apparatus 20 according to the present embodiment will be described. FIG. 3 is a flowchart showing a flow of processing in the improved generative adversarial network implementation apparatus 20. As shown in FIG. 3, firstly, n =1 is set (step S01), and the generator 11 is caused to generate and output the generated data (step S02). The n-th deformation operator 12n is caused to perform the deformation processing on the generated data and the training data to output generated data subjected to the deformation processing and training data subjected to the deformation processing (step S03). Then, the n-th discriminator 13n is caused to perform the discrimination processing on the generated data subjected to the deformation processing and the training data subjected to the deformation processing to output a discrimination result (step S04). On the basis of the discrimination result obtained in this manner, the update processing is performed on the n-th discriminator 13n (step S05). Subsequently, the update processing is performed on the generator 11 (step S06). The update processing has been performed on the n-th discriminator 13n and the generator 11, and it is determined whether the n-th discriminator 13n is the last discriminator, that is, whether n is maximum (step S07). In a case where n is not maximum (step S07-N), n=n+1 is set (step S08), the processing proceeds to the next discriminator, and the processing of steps S02 to S06 is executed. The update processing is performed for all the discriminators and the generator, and the processing is ended at a stage where n becomes maximum (step 507-Y).

Note that in a case where the generative model is caused to learn by the improved generative adversarial network implementation apparatus 20, when a flow from START to END in the flowchart of FIG. 3 is counted as one set, it goes without saying that it may be necessary to repeatedly execute a plurality of sets of the flow in order to obtain a learned model capable of generating desired generated data (generator 11 after learning). Furthermore, although the description has been made with reference to FIG. 3, on the assumption that the flow until all the plurality of discriminators 13a to 13n provided is used at least once is counted as one set, timing at which learning is ended does not need to be set for each set. The learning may be ended at any timing on a user's discretion.

Figure 4:
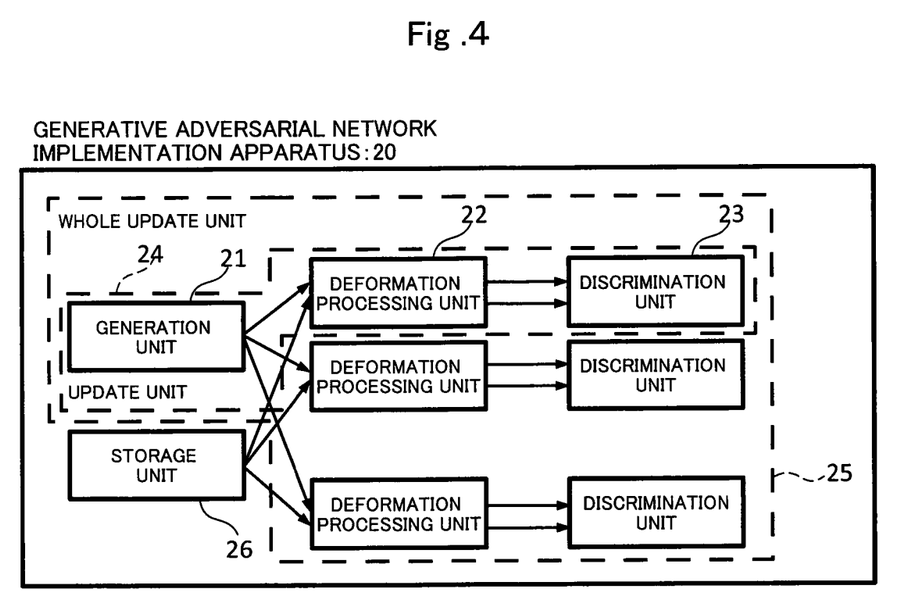
FIG. 4 is a block diagram showing relationships of units in a case where the processing is executed in the improved generative adversarial network implementation apparatus.

FIG. 4 is a block diagram showing relationships of units in a case where processing is executed in the improved generative adversarial network implementation apparatus 20. FIG. 4 is a diagram showing an example of how each unit in the block diagram of the improved generative adversarial network implementation apparatus 20 shown in FIG. 2 performs the processing of the flowchart shown in FIG. 3 in association with one another when each unit performs the processing. As shown in FIG. 4, the learning processing of the generative model is executed by each unit functioning in association with one another.

As described above, according to the improved generative adversarial network implementation apparatus 20 according to the embodiment of the present invention, the plurality of discriminators 13a to 13n is provided for one generator 11, and the plurality of deformation operators 12a to 12n is provided in order that data obtained by performing the deformation processing on the generated data and training data, which is to be discriminated by the plurality of discriminators 13a to 13n, is set as data to be discriminated. After the plurality of deformation operators 12a to 12n reduces an amount of information of original data through various deformation processing, data subjected to the deformation processing is input in each of the plurality of discriminators 13a to 13n, and updates are performed for the generator 11 and each of the plurality of discriminators 13a to 13n. Therefore, as compared with a case where a conventional generator and a conventional discriminator correspond to each other in a one-to-one correspondence, it is possible to improve the stability of learning and it is also possible to generate high quality generated data even if an ultra-high dimensional generative model is caused to learn. Furthermore, by variously differentiating the contents of the deformation processing in the plurality of deformation operators 12a to 12n, the learning progresses such that the generator 11 generates generated data corresponding to various deformation processing. Therefore, the embodiment of the present invention is effective in improving the stability of the learning and increasing the quality of the generated data.

Second Embodiment

In the first embodiment, the improved generative adversarial network implementation apparatus 20 has been described. However, the embodiment may be a non-transitory computer-readable storage medium storing an improved generative adversarial network implementation program for implementing functions similar to the functions of the improved generative adversarial network implementation apparatus 20. That is, even with a non-transitory computer-readable storage medium storing an improved generative adversarial network implementation program that implements a generation function, a deformation processing function, a discrimination function, an update function, and a whole update function, effects similar to the effects of the improved generative adversarial network implementation apparatus 20 according to the first embodiment can be obtained. The generation function is configured to cause a generator to generate and output generated data from a predetermined input on the basis of a function expressed by a configuration of a multilayer perceptron. The deformation processing function is configured to cause each of a plurality of deformation operators to execute deforming processing, each of the plurality of deformation operators performing the deforming processing on the training data and/or the generated data in the preceding stage of each of a plurality of discriminators. The deformation processing function is configured to then cause each deformation operators to output training data subjected to the deformation processing and/or generated data subjected to the deformation processing obtained by the deformation processing, as data to be discriminated, to the discriminator corresponding to each deformation operator. The discrimination function is configured to cause each of the plurality of discriminators to execute discrimination processing to output a discrimination result, each of the plurality of discriminators configured to receive an input of data to be discriminated that is based on training data and/or the generated data output by the generator, each of the plurality of discriminators performing the discrimination processing that discriminates whether the data to be discriminated is based on the training data or based on the generated data, on the basis of on a function expressed by a configuration of a multilayer perceptron, each of the plurality of discriminators outputting a discrimination result. The update function is configured to update the discriminator that has output the discrimination result, on the basis of the discrimination result such that the data to be discriminated is discriminated with higher accuracy and configured to further update the generator such that a probability that the discriminator discriminates that the data to be discriminated that is based on the generated data is the data to be discriminated that is based on the training data increases. The whole update function is configured to cause the updates by the update function to be executed for the generator and all the discriminators.

[Third Embodiment]

In the first embodiment, the improved generative adversarial network implementation apparatus 20 has been described. However, the embodiment can also be described as an embodiment of the invention of a learned model generation method using an improved generative adversarial network. That is, even with a learned model generation method including a generation step, a deformation processing step, a discrimination step, an update step, and a whole update step, effects similar to the effects of the improved generative adversarial network implementation apparatus 20 according to the first embodiment can be obtained. The generation step is a step of causing a generator to generate and output generated data, the generator generating and outputting the generated data from a predetermined input, on the basis of a function expressed by a configuration of the multilayer perceptron. The deformation processing step is a step of causing a plurality of deformation operators to execute deformation processing, each of the plurality of deformation operators performing the deformation processing on training data and/or the generated data in the preceding stage of each of the plurality of discriminators, the step then causing each deformation operator to output training data subjected to the deformation processing and/or generated data subjected to the deformation processing obtained by the deformation processing, as the data to be discriminated, to the discriminator corresponding to each deformation operator. The discrimination step is a step of causing each of the plurality of discriminators to execute discrimination processing to output a discrimination result, each of the plurality of discriminators configured to receive an input of data to be discriminated that is based on training data and/or the generated data output by the generator, each of the plurality of discriminators performing the discrimination processing that discriminates whether the data to be discriminated is based on the training data or based on the generated data, on the basis of a function expressed by a configuration of a multilayer perceptron, each of the plurality of discriminators outputting a discrimination result. The update step is a step of updating the discriminator that has output the discrimination result, on the basis of the discrimination result such that the data to be discriminated can be discriminated with higher accuracy, the step further updating the generator such that a probability that the discriminator discriminates that the data to be discriminated that is based on the generated data is the data to be discriminated that is based on the training data increases. The whole updating step is a step of causing the updates by the update step to be executed for the generator and all the discriminators. When learning is advanced by these steps, the generator becomes a generative model capable of generating generated data approximate to the training data. Therefore, the generative model can be used as a learned model.

In the first embodiment, description has been made on the assumption that the deformation operators $12a$ to $12n$ and the discriminators $13a$ to $13n$ are provided, the number of the deformation operators $12a$ to $12n$ equals the number of the discriminators $13a$ to $13n$, and the deformation operators $12a$ to $12n$ and the discriminators $13a$ to $13n$ are in a one-to-one correspondence relationship. However, embodiments are not limited to this configuration. For example, a configuration in which a plurality of discriminators is arranged in the subsequent stage of one deformation operator may be adopted. That is, it is possible to adopt a configuration in which one deformation operator performs the same deformation processing, but as for discrimination processing subsequent to the deformation processing, a plurality of discriminators performs different update processing. Even an embodiment in such a configuration is similar to the first embodiment in that effects of improving of the stability of learning and increasing the quality of generated data are obtained as compared with the conventional GAN.

In the first to third embodiments, description has been made on the basis of a configuration in which a plurality of deformation operators is arranged between a generator and a plurality of discriminators. However, a configuration in which a generator and a plurality of discriminator are provided and a deformation operator is not used may be adopted. In this case, each discriminator performs discrimination processing on training data itself or generated data itself as data to be discriminated. Even with such a configuration, the effect of improving the stability of learning can be expected as compared with a case where a conventional generator and a discriminator correspond to each other in a one-to-one correspondence.

What is claimed is:

1. A method for generating a generator, the method comprising:
    generating, by using the generator, by at least one processor, data from input data;
    deforming, by the at least one processor, at least one of the generated data or training data;
    discriminating by using discriminators, by the at least one processor, at least one of the deformed generated data or the deformed training data, and outputting at least one discrimination result; and
    updating, by the at least one processor, at least the generator based on each discrimination result,
    wherein the deforming is operated by operators, each operator related with each of the discriminators as one-to-one-correspondence and operating a different kind of deforming operation from a deforming operation of at least one of the other operators,
    wherein the operators deform the generated data or the training data.

2. The method according to claim 1, wherein the generated data and the training data are image data, and each of the operations includes at least one of a reduction, a blurring, or a contrast changing.

3. The method according to claim 1, wherein the generated data and the training data are audio data, and each of the operations includes at least one of a lowering sampling rate, or a reverberating.

4. The method according to claim 1 further comprising:
    iterating, by the at least one processor, the updating of at least the generator a plurality of times.

5. A data generation method comprising:
    generating data using the updated generator updated by the updating recited in the method according to claim 1.

6. A data generation method comprising:
    generating data using the updated generator updated by the updating recited in the method according to claim 2.

7. A data generation method comprising:
    generating data using the updated generator updated by the updating recited in the method according to claim 4.

8. A method for generating a generator comprising:
    generating by using generator data from input data;
    discriminating by using a first discriminator, at least one of deformed generated data or deformed training data formed by a first kind of deforming operation related with the first discriminator, and discriminating by using a second discriminator, at least one of deformed generated data or deformed training data formed by a second kind of deforming operation related with the second discriminator, the first kind of deforming operation being a different kind of deforming operation from the second kind of deforming operation; and
    updating the generator based on at least discrimination result results of the first and second discriminators.

9. The method according to claim 8, wherein the generated data and the training data are image data, and each of the operations includes at least one of a reduction, a blurring, or a contrast changing.

10. The method according to claim 8, wherein the generated data and the training data are audio data, and each of the operations includes at least one of a lowering sampling rate, or a reverberating.

11. The method according to claim 8 further comprising:
    iterating the updating of the generator a plurality of times.

12. A data generation method comprising:
    generating data using the updated generator updated by the updating recited in the method according to claim 8.

13. A data generation method comprising:
    generating data using the updated generator updated by the updating recited in the method according to claim 9.

14. A data generation method comprising:
    generating data using the updated generator updated by the updating recited in the method according to claim 11.

15. A device for training a model comprising:
    at least one memory; and
    at least one processor configured to:
        generate, by using a generator, data from input data;
        deform at least one of the generated data or training data;
        discriminate, by using discriminators, at least one of the deformed generated data or the deformed training data, and output at least one discrimination result; and
        update the generator and each of the discriminators based on each discrimination result, wherein the at least one processor deforms by using operators, each operator related with each of the discriminators in one-to-one-correspondence and operating a different kind of deforming operation from a deforming operation of at least one of the other operators, wherein the operators deform the generated data or the training data.

16. The device according to claim 15, wherein the generated data and the training data are image data, and each of the operations includes at least one of a reduction, a blurring, or a contrast changing.

17. The device according to claim 15, wherein the generated data and the training data are audio data, and each of the operations includes at least one of a lowering sampling rate, or a reverberating.

18. The device according to claim 15 wherein the at least one processor is further configured to iterate the update of the generator and the discriminators a plurality of times.

19. A data generation device comprising:
at least one memory; and
at least one processor configured to:
generate data by using the updated generator updated by the updating performed by the device according to 15.

20. A data generation device comprising:
at least one memory; and
at least one processor configured to:
generate data by using the updated generator updated by the updating performed by the device according to 16.

21. A data generation device comprising:
at least one memory; and
at least one processor configured to:
generate data by using the updated generator updated by the updating performed by the device according to 18.

22. A non-transitory computer readable medium storing a generator that is generated through at least steps of:
discriminating by using a first discriminator, between deformed generated data that is generated by the generator and formed by a first kind of deforming operation and deformed training data that is formed by the first kind of deforming operation, and discriminating by using a second discriminator, between deformed generated data that is generated by the generator and formed by a second kind of deforming operation and deformed training data that is formed by the second kind of deforming operation; and
updating the generator based on at least discrimination results of the first and second discriminators,
wherein the first kind and the second kind of deforming operations are related with the first and the second discriminators, respectively, and are different kinds of deforming operations, and
wherein the updated generator is used by at least one processor to generate new data.

23. The non-transitory computer readable medium according to claim 22, wherein the deformed generated data and the deformed training data are image data, and each of the deforming operations includes at least one of a reduction, a blurring, or a contrast changing.

24. The non-transitory computer readable medium according to claim 22, wherein the deformed generated data and the deformed training data are audio data, and each of the deforming operations includes at least one of a lowering sampling rate, or a reverberating.

* * * * *